June 17, 1958 R. W. WHITAKER 2,839,442
PROCESS OF MAKING A LIGHTWEIGHT STRUCTURAL PANEL
Filed Feb. 23, 1955 2 Sheets-Sheet 1
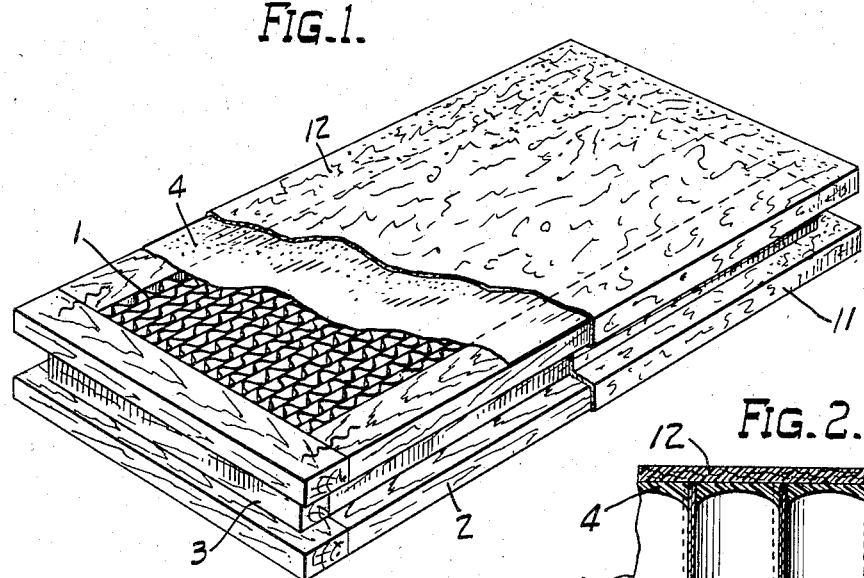
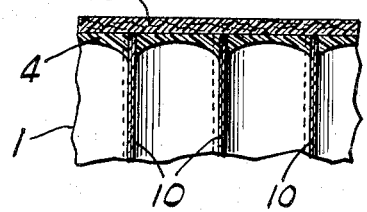
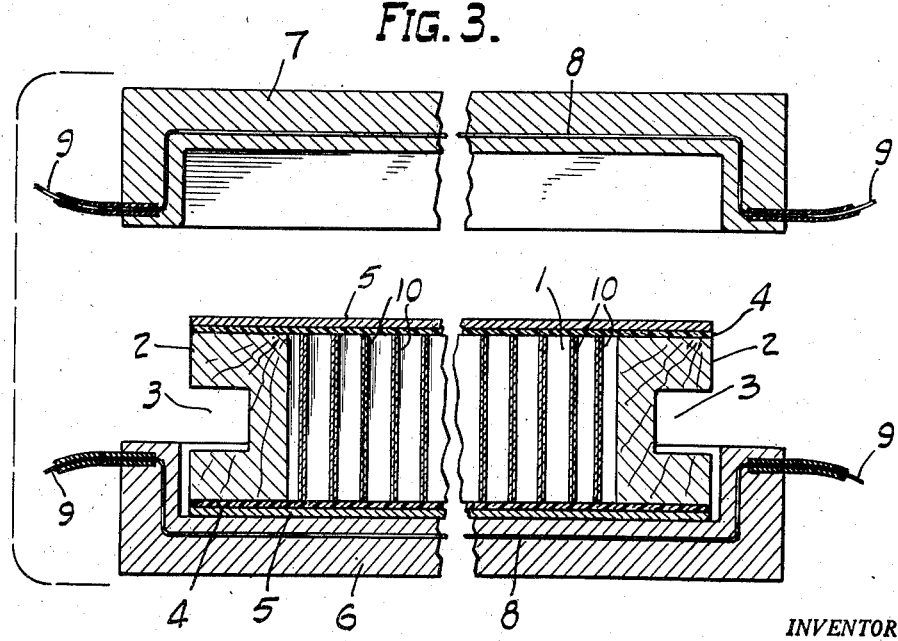
INVENTOR.
Robert W. Whitaker
BY
Andrus + Scealer
Attorneys June 17, 1958  R. W. WHITAKER  2,839,442
PROCESS OF MAKING A LIGHTWEIGHT STRUCTURAL PANEL
Filed Feb. 23, 1955  2 Sheets-Sheet 2

INVENTOR.
Robert W. Whitaker
BY
Attorneys

United States Patent Office 2,839,442
Patented June 17, 1958

2,839,442
PROCESS OF MAKING A LIGHTWEIGHT STRUCTURAL PANEL

Robert W. Whitaker, Wauwatosa, Wis., assignor to A. O. Smith Corporation, Milwaukee, Wis., a corporation of New York Application February 23, 1955, Serial No. 489,838

6 Claims. (Cl. 154—118)

This invention relates to a structural panel and a process for making the same, and more particularly to a lightweight panel having an open cell-type core faced with a sheet material.

Structural panels are characterized by having light weight and high strength, and are used for structural elements such as walls, roofs, doors and the like. Because of the light weight characteristic of the panels they can be conveniently handled and lend themselves particularly well to prefabricated operations. Structural panels are usually formed of a lightweight core material of an open cell type or a foam type. The core material may take the form of honeycomb or corrugated paper, balsa wood, foam plastic or the like. The core is faced with a sheet material such as metal, glass coated steel, plywood, hardboard, cement asbestos board or fiber reinforced plastic which provides a load carrying facing and a smooth outer surface for the core.

In the manufacture of structural panels formed of an open-cell core and fiber reinforced plastic facings, it is desirable to laminate the facings and bond the same to the core in a single operation. However, as large quantities of resin are required to impregnate the fiber reinforcing material and bond the same to the core during the laminating operation, the resin penetrates into the cells of the core and this increases the amount of resin required for bonding purposes and thereby increases the weight of the panel. Because of these difficulties it has not proven satisfactory to laminate the facings and bond the same to the core in a single operation.

To avoid the above difficulties it has been proposed to partially cure the resin, which is employed to bond the reinforcing material, before applying the reinforcing material to the core. Subsequent pressure during the curing operation tends to force the partially cured resin into the cells thereby resulting in a dimpled outer appearance on the facing which is undesirable. It has also been proposed to use a pre-impregnated matting in which the resin is in a partially cured state. Again, pressure during laminating results in the undesired dimpled appearance of the facing.

The present invention is directed to a method of laminating a fiber reinforced facing and bonding the same to a cellular core in a single operation to form a lightweight structural panel having a smooth continuous facing.

According to the present invention the cells of the core are initially sealed by a thin layer of a liquid, uncured resin which is applied to the face of the core. The thickness of the resin layer at the center portion of the cells is from .004 to .030 inch. After the resin layer has been cured, a layer of resin impregnated reinforcing material is applied directly to the sealed faces of the core under pressure to laminate the reinforcing material to the core and completely encapsulate the core.

As the cells of the core are sealed by the cured resin film, the resin employed for laminating cannot penetrate the cells, thereby preserving the lightweight characteristic of the core and providing a smooth surfaced facing.

The drawings illustrate the best mode presently contemplated of carrying out the present invention.

In the drawings:

Figure 1 is a perspective view with parts broken away in section of the completed panel;

Fig. 2 is an enlarged fragmentary section of the panel;

Fig. 3 is a diagrammatic view of the apparatus for sealing the cells with resin with the die members in the open position;

Figure 4:
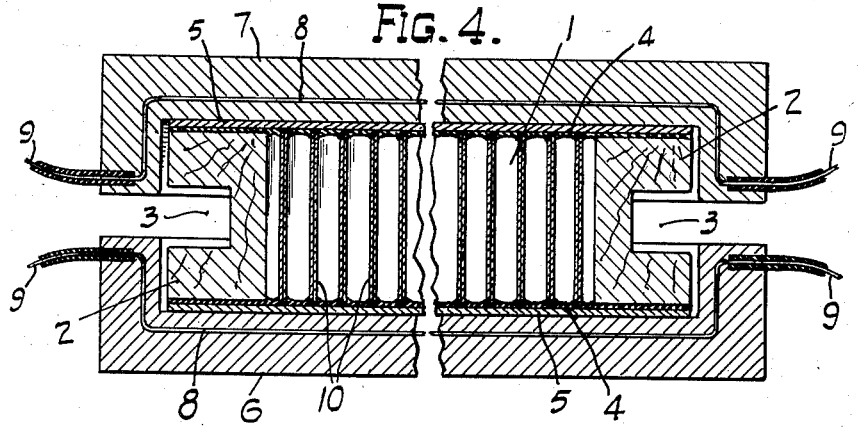
Fig. 4 is a view similar to Fig. 3 with the die members in the closed position.

The drawings illustrate a lightweight structural panel and a method of forming the same. The panel includes an open cell core 1 formed of corrugated or honeycombed paper or the like. The open cell core provides a lightweight high strength core material for the panel.

To provide a solid edging for the core 1 a strip of edging material 2 is disposed around the peripheral edge of the core. The edging material is formed of a lightweight substance such as balsa wood and is provided with a central groove 3 which is adapted to receive a spline for the subsequent attachment of the panels. The edging material 2 is not necessarily attached to core 1 but is loosely maintained in position therearound.

To seal the cells of the core 1 and prevent the resin from penetrating therein during the laminating process, a thin layer film of a liquid uncured thermosetting resin 4 is applied to both faces of the core 1 and the edging material 2. The film 4 is applied with a minimum thickness, generally in the range of .004 to .030 inch at the center portion of the cells. The particular thickness of the film 4 depends on the strength characteristics of the resin employed and the diameter of the cells. For smaller cells, having a diameter of ⅛ to ¼ inch, the film may have a thickness of .004 to .015 inch, while for larger cells up to ¾ inch in diameter the film may have a thickness in the range of .015 to .030 inch. The resin film 4 serves to seal off the cells and entraps a quantity of air therein so that the resin in the subsequent laminating process will not be able to penetrate into the cells and the core will thereby retain its lightweight characteristics. The resin film 4 also extends across and seals the joint between the core and the edging material 2 so that resin in the subsequent laminating process will not penetrate this joint.

Added strength may be given to the resin film 4 by reinforcing the resin with a fine grade of fibrous material, such as mineral, synthetic, vegetable or animal fibers.

The film 4 may be applied to the faces of the core 1 by transferring the film from a pressure member to the core. This can be accomplished by initially coating a pair of metal sheets 5 with a thin film of resin by brushing, blading, spraying, rolling or the like. One of the sheets 5 is disposed on a lower die member 6 with the resin film facing upwardly. The core 1 with the attached edging material 2 is placed on sheet 5 and a second sheet 5 is placed on the upper face of the core with the resin film facing downwardly toward the core.

An upper die member 7 is lowered toward die member 6 thereby pressing the sheets 5 against the faces of the core 1 to transfer the resin film to the core and seal the cells in the core. While sheets 5 are pressed aaginst the core, heat is applied to cure the resin by means of heating elements 8 which are embedded in the die members 6 and 7. Each of the heating elements 8 is connected by electrical leads 9 to a suitable source of electrical energy, not shown.

The thin resin film 4 is cured by the heat to provide a continuous film which extends over the faces of the core and the edging material 2. As shown in Fig. 2, the resin layer 4 forms a fillet or arch-like structure between the walls 10 of the cells and this provides an enlarged surface area of bonding between the resin and the cell walls and thereby stiffens the walls. The portion of the resin layer 4 disposed on the outer edge of the cell walls is very thin due to the pressure exerted by the sheets 5 against the core. If desired, this thin layer of resin on the edge of the cell walls at the face of the core can be removed after curing by sanding or the like to expose the edge and roughen the same. The exposed edges tend to provide a firmer bond between the core and the facing during the subsequent laminating operation.

In addition the entire faces of the core may also be scuff sanded to further roughen the same and aid in the subsequent laminating process.

Figure 5:
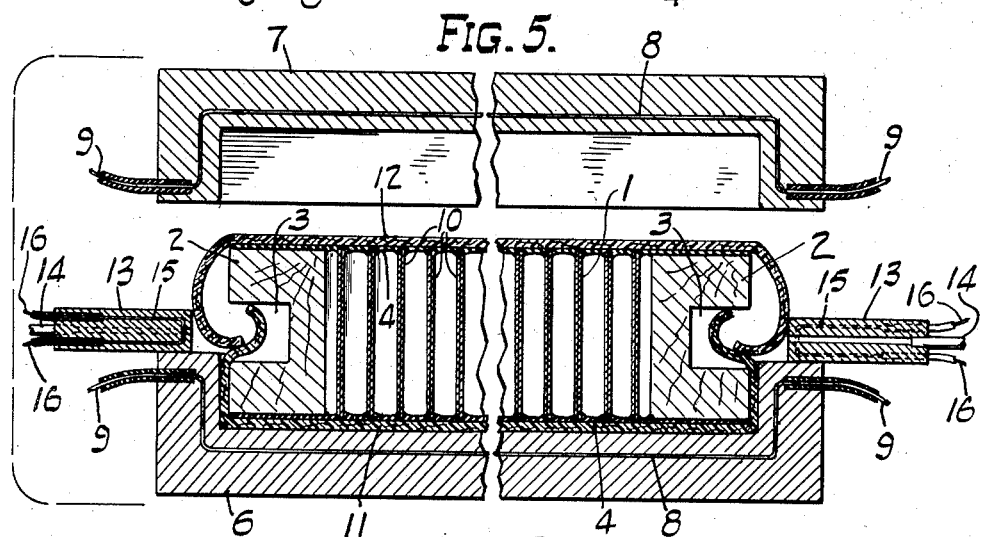
Fig. 5 is a diagrammatic view of the apparatus for laminating the facing to the core and the edge members with the die members shown in the open position.
Figure 6:
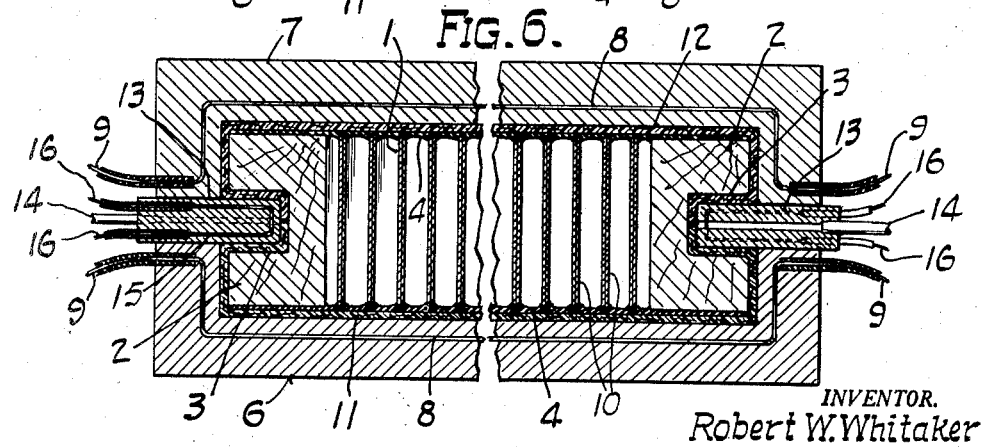
Fig. 6 is a view similar to Fig. 5 with the die members in a closed position.

With the cells sealed, the facing material is laminated directly to the core and the resin employed in the laminating process will not penetrate into the cells of the core. To laminate the facing material to the core, a layer of fibrous reinforcing material 11 in the form of mat, fabric, roving or the like, and made of mineral, synthetic, vegetable or animal fibers, is disposed on the upper surface of the lower die member 6. The layer of reinforcing material 11 extends upwardly beyond the side walls of the die member 6 as shown in Fig. 5. The reinforcing material 11 is then impregnated with resin by spraying, blading, brushing or pouring the resin onto the material. Alternately the material 11 may be suitably impregnated with resin before it is placed into the die member 6.

The core 1 with the cells sealed is then disposed on the resin impregnated reinforcing material 11 and a second layer of fibrous reinforcing material 12 is placed on the top of core 1. The material 12 overhangs the edges 2 of the core as shown in Fig. 5. Resin is then applied to the reinforcing material 12 to fully impregnate the same or the reinforcing material 12 may be pre-impregnated.

The upper die member 7 is then lowered to press the layers of reinforcing materials 11 and 12 against the respective faces of the core 1. The upper die member 7 bends the edge portions of the layer of reinforcing material 12 around the edging material 2 of the core as the die member is lowered.

To mold the edges of the panel integral with the facings, a plurality of edge dies 13 corresponding in number to the side edges of core 1 are disposed to be received within the recesses 3 formed in the edging material 2. The edge dies 13 turn or fold the layers of reinforcing material 11 and 12 into the recesses 3 so that the fibrous reinforcement extends completely over the facings of the panel and into the edge recess 3.

To further impregnate the reinforcing material disposed within recesses 3 with resin, the edge dies 13 may be provided with a plurality of openings which receive tubes 14. The tubes are connected to a suitable source of resin under pressure, not shown. Resin under pressure is injected through tubes 14 to impregnate the reinforcing material in the area of the edges of the panel and particularly in the recess 3. As the resin is introduced under pressure, it tends to flow outwardly toward the faces of the core to fill any voids in the facing where inadequate impregnation of the reinforcing materials 11 and 12 may have occurred.

With the die members 6, 7 and 13, exerting pressure against the core, heat is then supplied to the resin to cure the same by heating elements 8. The heat is also supplied to the edge dies 13 by means of heating elements 15 which are embedded therein. Each of the elements 15 is connected by electrical leads 16 to a suitable source of electrical energy, not shown.

The cured structural panel is characterized by high strength and light weight, for the cells are initially sealed and no resin can penetrate therein during the laminating process to increase the weight of the panel. The panels are provided with a load carrying, tough, smooth surfaced covering or facing which is continuous and extends completely around the panel. The reinforcing material not only extends over the facings of the core but also over the edge material 2 and into the recesses 3 so that the entire surface of the panel is adequately reinforced.

While the present invention has been described with the core 1 being generally rectangular in shape and bordered by edging material 2, it is contemplated that the core may be any desired configuration and the edging material may be eliminated, if desired. In the event that the edging material 2 is not employed, the edges of the core 1 may be routed to provide the recess 3 or the edges may have any desired cross section to enable the panels to be attached together.

Similarly, the resin film 4, while described as covering the faces of core 1 and edging material 2, may completely encapsulate the core and edging material or the core itself if no edging material is employed.

The process may also be carried out by other apparatus than that described herein.

Various modes of carrying out the invention are contemplated as being within the scope of the following claims particularly pointing out and distinctly claiming the subject matter which is regarded as the invention.

I claim:

1. A process for making a structural panel having an open cell core and a fiber reinforced facing material extending continuously over the core, which comprises the steps of assembling an edging material along the edges of the core, applying a thin film of a liquid uncured resin to a face of said core and the corresponding face of the edging material, curing the resin film to seal the cells of the core and seal the joint between the core and the edging material, applying a quantity of liquid uncured resin and a layer of fiber reinforcement to the face of the core and to the corresponding face of the edging material, curing said second named resin to bond the reinforcement to the core and provide a lightweight strong panel.

2. A process for making a structural panel having a lightweight core composed of a plurality of walls defining a series of open cells and having a fiber reinforced facing material extending continuously over the core, which comprises the steps of assembling an edging material along the edges of the core, applying a thin film of a liquid uncured resin to a face of said core and the corresponding face of the edging material, curing the resin film to seal the cells of the core and seal the joint between the core and the edging material, removing a thickness of the resin film disposed on the face of the core to expose the edges of the cell walls while maintaining the seal across the cells, applying a quantity of liquid uncured resin and a layer of fiber reinforcement to the face of the core and to the corresponding face of the edging material, and laminating said reinforcement to the exposed edges of the cell walls and to the resin film sealing the cells to provide a strong lightweight panel having a smooth outer facing.

3. A process for making a structural panel having an open cell core and a fiber reinforced facing material extending continuously over the core, which comprises the steps of applying a thin film of a liquid uncured resin to a pressure member, forcing the pressure member against a face of the core to transfer the film to said face, said film extending continuously across the face to seal the cells at the face, curing the resin film to seal the cells of the core, and bonding a layer of fiber reinforcement to the cured resin film sealing the cells by means of a resinous material to provide an integral lightweight panel.

4. A process for making a structural panel having an open cell core and a fiber reinforced facing material extending continuously over the core, which comprises the steps of assembling an edging material along the edges of the core, pressing a thin film of a liquid uncured resin into contact with the faces of the core to transfer the film to the faces and seal the cells therein, applying heat to the resin to cure the same, covering the faces of the core and the edging material with a layer of fibrous material, impregnating the portion of the layer covering said faces with a liquid uncured resin, forcing a liquid resin under pressure into contact with the portion of the layer covering said edges to impregnate said second named portion, and curing the resin to provide a strong lightweight panel having a smooth outer facing.

5. A process for making a structural panel having an open cell core and a fiber reinforced facing material extending continuously over the core, which comprises the steps of sealing the cells of the core with a thin film of a resinous material to entrap a quantity of air within the cells, applying a layer of fibrous reinforcing material to each of the opposite faces of the core with the edge portions of the layers overhanging the corresponding edges of the core, bending the edge portions of the layers over the respective edges of the core to bring the edges of each layer into contact with the corresponding edges of the other of said layers to provide a continuous covering of fibrous material on said core, impregnating the portions of the fibrous layers disposed on the faces of the core with resin and laminating said portions to the respective faces, and forcing a liquid uncured resin under pressure into contact with the edge portions of the layers disposed over the edges of the core and bonding said edge portions to the respective edges of the core.

6. A process for making a structural panel having a lightweight core defining a series of cells opening on opposite faces of the core, which comprises the steps of assembling an edging material along the edges of the core, curing a thin film of thermosetting resin onto the faces of said core to seal the cells at said faces and extending said cured resin across the joint between the edging member and the core to seal said joint, applying a layer of fibrous reinforcement over the faces of the core and over the edging member, and bonding said fibrous layer to said film and to the edging member to provide a continuous facing for the panel.

References Cited in the file of this patent

UNITED STATES PATENTS

| | | |
|---|---|---|
| 2,029,048 | Atwood | Jan. 28, 1936 |
| 2,518,164 | Meyer | Aug. 8, 1950 |
| 2,538,776 | Griswold | Jan. 23, 1951 |
| 2,556,011 | Swayze et al. | June 5, 1951 |
| 2,606,598 | Smith | Aug. 12, 1952 |
| 2,608,500 | Del Mar et al. | Aug. 26, 1952 |
| 2,622,999 | Faussner | Dec. 23, 1952 |
| 2,663,527 | Joslyn | Dec. 23, 1953 |
| 2,688,579 | Meyer | Sept. 7, 1954 |
| 2,700,634 | Ackerlind | Jan. 25, 1955 |
| 2,719,809 | Herts | Oct. 4, 1955 |

FOREIGN PATENTS

| | | |
|---|---|---|
| 613,529 | Great Britain | Nov. 30, 1948 |

OTHER REFERENCES

British Plastics, October 1949, "Honeycomb Sandwich Construction," G. May, pp. 64–66.